A. F. WALLBILLICH.
DRIVING GEAR FOR VEHICLE RECORDING INSTRUMENTS.
APPLICATION FILED JULY 21, 1917.
1,278,531.
Patented Sept. 10, 1918.
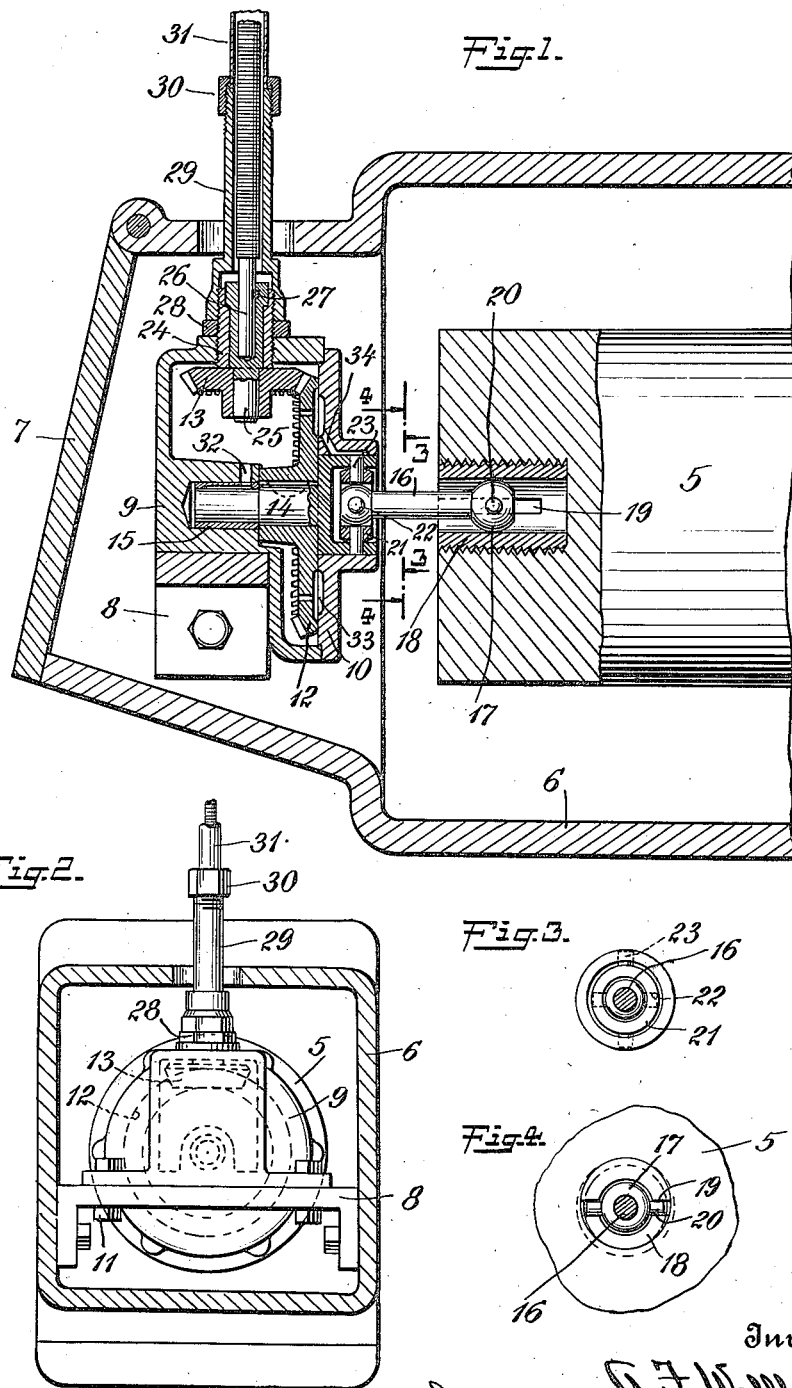

UNITED STATES PATENT OFFICE.

ANTHONY F. WALLBILLICH, OF BRIDGEPORT, CONNECTICUT, ASSIGNOR TO AUTO-GRAPHIC RECORDER COMPANY, A CORPORATION OF NEW JERSEY.

DRIVING-GEAR FOR VEHICLE RECORDING INSTRUMENTS.

1,278,531.   Specification of Letters Patent.   Patented Sept. 10, 1918.

Application filed July 21, 1917.   Serial No. 181,969.

*To all whom it may concern:*

Be it known that I, ANTHONY F. WALL-BILLICH, a citizen of the United States, residing at Bridgeport, in the county of Fairfield, State of Connecticut, have invented certain new and useful Improvements in Driving-Gears for Vehicle Recording Instruments; and I do hereby declare the following to be a full, clear, and exact description of the invention, such as will enable others skilled in the art to which it appertains to make and use the same.

This invention is directed to the provision of an improved form of driving gear for driving from an axle of a vehicle a recording or indicating instrument mounted on the vehicle. The invention may be employed in connection with vehicles of various descriptions but it is specially adapted for use on railway locomotives.

The object of the invention is to provide a driving gear for this use which is reliable in operation under the severe conditions to which it is subjected and which is of simple construction, may be manufactured at low cost and may be mounted within a journal box inclosing one end of the axle of the driving wheels.

The improved driving gear consists primarily of a pair of bevel gears mounted upon and inclosed within a suitable casing which may be mounted within a journal box opposite the end of the axle from which the recording or indicating instrument is driven. One of the two bevel gears is arranged with its axis substantially coincident with the axis of the driving axle and a connection is established between this gear and the axle of such a construction as to permit of movement of the gear and axle relatively in the direction of their common axis or in a direction transverse to that axis. The casing within which the two bevel gears are inclosed is arranged to serve as a receptacle for a lubricant from which the bevel gears and the bearings therefor are constantly supplied with the lubricant. Also, the bearings for the shaft of one of the bevel gears is so constructed as to facilitate a readjustment incident to substitution of a bevel gear of one size for one of a different size in accordance with changes in the diameter of the driving wheels resulting from wear of the wheels or substitution of one pair of wheels for another. The driving mechanism is commonly applied to the trailing wheels of a locomotive located below the cab of the locomotive. The diameter of these wheels varies with wear over such a range as to make changes in the driving connection to the instrument necessary from time to time in order to secure substantial accuracy of the readings of the instrument, and at long intervals a pair of worn wheels with their axle may be taken out and new ones substituted. As such wear occurs or when new wheels are substituted, suitable changes in the gearing connecting the axle to the instrument must be made and the construction constituting the present invention permits of making such changes readily with the chance of error in making the change minimized.

The invention will be better understood by reference to the following description taken in connection with the accompanying drawings which illustrate the preferred embodiment thereof.

In these drawings, Figure 1 is a sectional view of the end of the driving axle and the gearing connecting it to the instrument; Fig. 2 is a sectional view on a plane transverse to the plane of the section of Fig. 1, and Figs. 3 and 4 are sectional views on the lines 3—3 and 4—4, respectively, of Fig. 1.

Referring to these drawings, 5 indicates the trailing axle of a locomotive, the end of which is inclosed within a journal box 6 of the usual or any suitable construction provided with a hinged door 7. Within the journal box is a bracket or support 8 extending across the journal box near the door 7 and secured at its ends to the side walls of the box. This bracket 8 serves as a support for a casing consisting of two members 9 and 10. The member 9 rests upon the support 8 and is bolted thereto as indicated at 11. The member 10 is of annular shape and is bolted to the member 9. Within the casing formed by the members 9 and 10 is a pair of intermeshing bevel gears 12 and 13. The gear 12 is mounted parallel or substantially parallel to the end of the axle 5 and it is connected to the axle 5 by a universal joint permitting movement of the gear relatively to the axle angularly in any direction and also movement toward and away from the end of the axle. This gear 12 is keyed upon a short shaft 14 one end of which is received within a bearing formed in the member 9 which bearing is babbitted as indicated at 15. The opposite end of the shaft 14 is enlarged and hollowed out to a cup shape. This shaft is connected to the end of the axle 5 by a short rod 16. The end of this rod is of spherical shape as shown at 17 and fits snugly within a bushing 18 which is threaded into an axial opening in the end of the axle 5. The bushing 18 has lengthwise slots 19 therein diametrically opposite each other. The ball 17 on the end of rod 16 has a pin 20 extending diametrically through it and the ends of this pin 20 are received in the two slots 19. The opposite end of the rod 16 is also of spherical form and fits snugly within an annulus 21. A pin 22 extending diametrically through the ball on this end of the rod 16 has its ends received in openings in the annulus 21. Also the annulus 21 has pins 23 extending therefrom at diametrically opposite points and forming trunnions which are received in openings in the walls of the cup-shaped end of the shaft 14.

By reason of this construction, the axle 5 may move relatively to the casing consisting of the members 9 and 10 in any direction. When these two parts move toward and away from each other, the ends of the pin 20 slide back and forth in the grooves or slots 19. When any relative movement of these parts occurs other than a movement toward and away from each other, the connections at the ends of the rod 16 permit of the movement and maintain the driving connection from the axle 5 to the shaft 14 of the gear 12.

In the top wall of the member 9 of the casing is a threaded opening which receives an exteriorly threaded bushing 24. The interior of this bushing forms a bearing for a short shaft 25 on which the bevel gear 13 is secured. The flexible shaft 26 which extends up to the instrument on the cab of the locomotive is secured to the short shaft 25 in any suitable manner as for instance by the pin shown at 27. A lock nut 28 is threaded on the bushing 24 directly above the top wall of the member 9. Directly above this lock nut 28 is a tubular casing 29 for the lower end of the flexible shaft 26. The lower end of the tubular member 29 is interiorly threaded and is screwed upon the upper end of the bushing 27, this tubular casing and the flexible shaft therein extending upwardly through an opening provided therefor in the top wall of the journal box 6. The tubular member 29 may be secured by means of a collar 30 to the inclosing casing 31 for the flexible shaft.

The space within the casing consisting of the members 9 and 10 forms a receptacle for a lubricant and in order to insure proper lubrication of all of the parts suitable ducts for oil are provided leading to the various bearings. A duct 32 extends through the wall of the member 9 to the bearing for the end of the shaft 14. Also an annular space 33 is provided between the gear 12 and the member 10 and a duct 34 leads from this space to the bearing for the rear end of shaft 14 within the member 10 of the casing.

It will be noted that the construction herein illustrated and described is very simple and consists of but few parts which may be readily assembled. The mechanism as a whole with the flexible shaft 26 and tubular member 29 temporarily disconnected therefrom may be inserted in position by passing it through the door of the journal box and projecting the end of the rod 16 into the axial opening in the end of the axle 5 with the ends of the pin 20 in the slots 19. The flexible shaft 26 is then connected to the shaft 25 and the tubular member 29 is then screwed up on the bushing 24 and connected to the casing 31. The connection through the rod 16 maintains the driving connection from the axle 6 to the gear 12 throughout all of the movements of the axle relatively to the gear occasioned by the operation of the locomotive as heretofore explained and the rotation of the gear 12 is transmitted through the gear 13 and short shaft 25 to the flexible shaft 26 leading to the instrument. A lubricant within the casing is constantly carried upward by the gear 12 and passes to the bearings for the shaft 14 through the ducts 32 and 34. The space within the casing below the enlarged end of the shaft 14 constitutes a well for the lubricant so that even if leakage of the lubricant occurs through the space around the end of shaft 14 when the casing is substantially full of lubricant, the well at the bottom of the casing will retain a sufficient amount of the lubricant for a long period of use of the mechanism.

In adjusting the parts to secure proper co-action of the gears 12 and 13, the gear 13 is moved to the proper position relatively to the casing member 9 by turning the bushing 24 in its threaded opening in the top wall of the member 9 and when the proper position of the bushing 24 has been secured the bushing is locked in this position by turning the lock nut 28 to jam it against the top surface of the member 9. From time to time during the use of the apparatus the flanges of the wheels on axle 5 wear down so that unless a change of the gear connection to the instrument were made the readings of the instrument would not be sufficiently accurate. Also after a pair of wheels have been worn down a certain amount, it is desirable to substitute a new pair of wheels therefor. As such wear of the wheels occurs and when new wheels are substituted, gears 12 of different numbers of teeth are substituted one for another. These gears may be so calculated that a diminution of the diameter of the driving wheels of a given amount, say one-half of an inch, will require the substitution of a gear 12 having one tooth less than the gear 12 previously used. With each such substitution of a gear 12 having a different number of teeth from the gear previously used, a change in the position of the gear 13 is necessary to reëstablish the proper intermeshing relation of the gears. The parts may be so calculated that for a change of a single tooth in the number of teeth on the gear 12, a definite angular movement of the bushing 24 is necessary to reëstablish the desired relation. When this is done, the operation of re-positioning the gear 13 may be conveniently effected by first unscrewing and raising the tubular member 29, then backing off the lock nut 28 through the prescribed angular distance without turning the bushing 24 and then turning the bushing 24 and lock nut 28 together in the opposite direction until the lock nut again jams upon the wall of the member 9. When this is done in the case of the substitution of a gear 12 having a number of teeth one less than the number of the gear previously used, the gear 13 will be lowered a small amount which is just sufficient to reëstablish the proper intermeshing relation of the two gears.

I claim:

1. A driving mechanism for vehicle recording instruments comprising the combination of a driving axle, a journal box for one end of the axle, a pair of intermeshing bevel gears mounted within the journal box opposite the end of the axle and a driving connection between the end of the axle and one of said gears which connection permits movement of the gears and the end of the axle toward and away from each other in the direction of the axis of the axle and in any direction transverse to said axis.

2. Driving gear for vehicle recording instruments comprising the combination of an axle, a journal box for the end of the axle, a casing mounted within the journal box, a pair of intermeshing bevel gears inclosed within the casing and mounted in bearings thereon, and a shaft movably connected at one end to the axle and at the other end to one of the bevel gears and permitting movement of the casing and the bevel gears therein relatively to the axle in any direction while maintaining the driving connection from the axle to one of the bevel gears.

3. Driving gear for vehicle recording instruments comprising the combination of an axle, a journal box therefor, a bracket extending across the journal box, a casing mounted on the bracket, a pair of bevel gears inclosed within the casing and mounted in bearings thereon, one of the gears being mounted opposite the end of the axle with its axis substantially coincident with the axis of the axle, and a rod connecting the axle to one of said bevel gears, said rod being movably connected at one end to the axle and at the other to the gear.

4. Driving gear for vehicle recording instruments comprising the combination of an axle, a journal box therefor, a casing mounted within the journal box, a pair of intermeshing bevel gears within the casing, a rod connected by a universal joint to the shaft of one of the gears, and trunnions on the opposite end of the rod entering slots in the wall of an axial opening in the end of the axle.

5. Driving gear for vehicle recording instruments comprising the combination of an axle, a journal box for the end thereof, a casing mounted within the journal box, a pair of bevel gears within the casing, one of which is connected to the axle, a shaft upon which the other bevel gear is mounted, a bushing forming a bearing for said shaft and threaded into an opening in said casing, and a lock nut threaded on said bushing and co-acting with the wall of the casing.

6. Driving gear for vehicle recording instruments comprising the combination of an axle, a journal box for the end thereof, a casing mounted within the journal box, a pair of bevel gears within the casing, one of which is connected to the axle, a shaft upon which the other bevel gear is mounted, a bushing forming a bearing for said shaft, a lock nut threaded on said bushing and co-acting with the wall of the casing, a flexible shaft extending through an opening in the journal box and having its end secured to said shaft, and a tubular member inclosing the flexible shaft and interiorly threaded at its lower end to co-act with the exterior threads on said bushing.

In testimony whereof I affix my signature.

ANTHONY F. WALLBILLICH.